Feb. 11, 1930. H. M. HURD 1,746,859
SCRAPER
Filed Jan. 21, 1927 2 Sheets-Sheet 1

INVENTOR.
Herman M. Hurd
BY
Fay, Oberlin & Fay
ATTORNEYS.

Feb. 11, 1930. H. M. HURD 1,746,859
SCRAPER
Filed Jan. 21, 1927 2 Sheets-Sheet 2
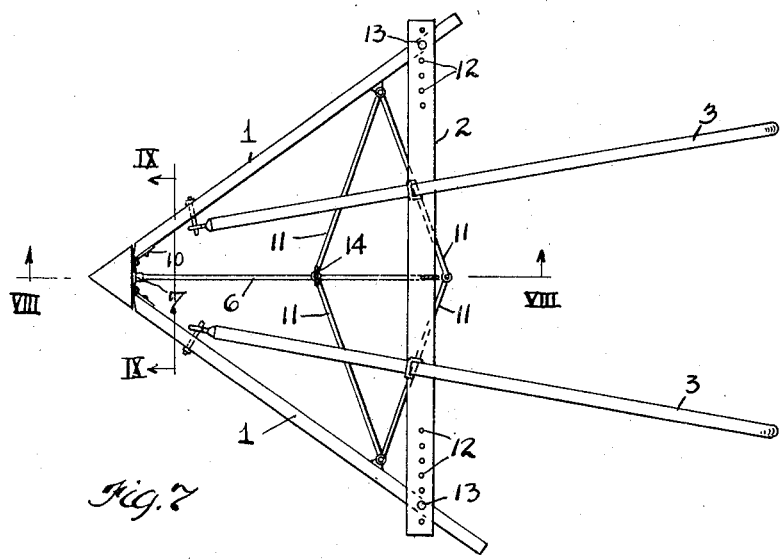
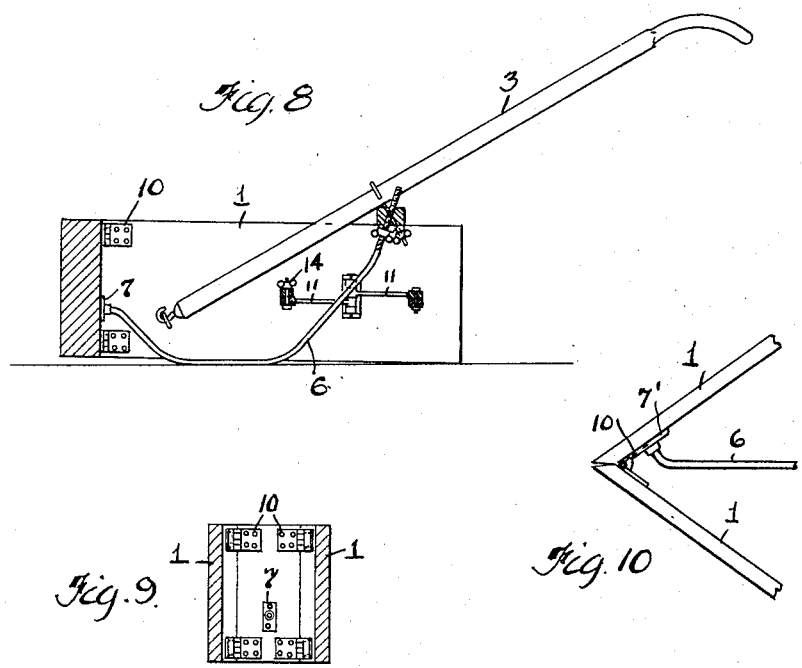
INVENTOR.
Herman M. Hurd
BY
Fay, Oberlin & Fay
ATTORNEYS.

Patented Feb. 11, 1930

1,746,859

UNITED STATES PATENT OFFICE

HERMAN M. HURD, OF YOUNGSTOWN, OHIO

SCRAPER

Application filed January 21, 1927. Serial No. 162,481.

This invention relates to scrapers or snow plows of a type adapted to be pushed along a walk or other surface. Heretofore a construction has been proposed in which the blades of the V-shape plow slide directly on the walk. Too much frictional drag is occasioned however, and the device requires too much power to push. In order to mitigate such drag, it has been proposed further to apply small wheels for the device to travel on. It is found though that the wheels are not well adapted for travel over icy surfaces, such as generally prevail in the use of a device of such character, and the implement is also difficult to guide. A practicable scraper easy to push and easy to guide is accordingly highly desirable.

To the accomplishment of the foregoing and related ends, the invention, then, consists of the features hereinafter fully described, and particularly pointed out in the claims, the following description and the annexed drawings setting forth in detail but a few of the various forms in which the principle of the invention may be applied.

Figure 1:
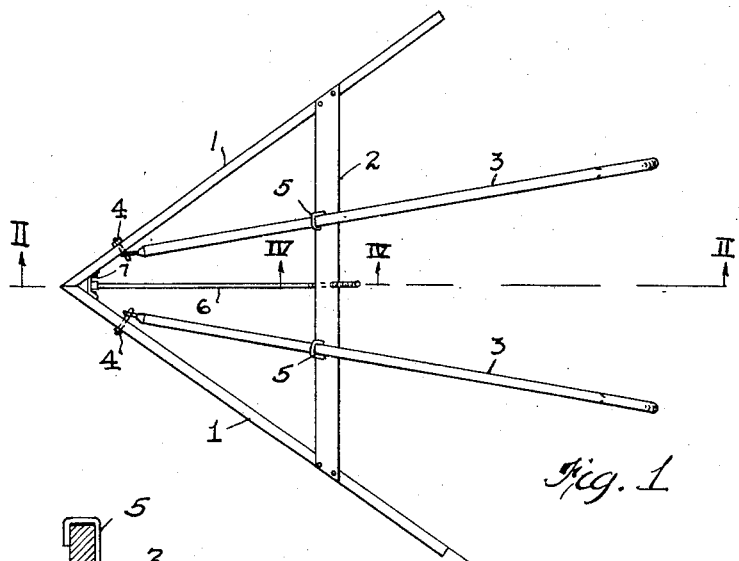
Figure 3:
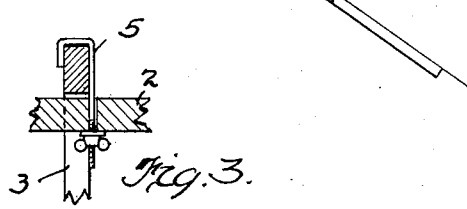
Figure 2:
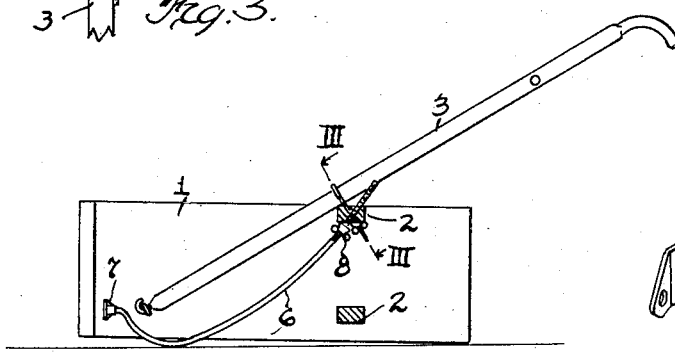
Figure 4:
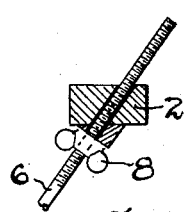
Figure 5:
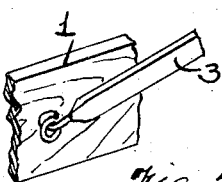

In said annexed drawings:

Fig. 1 is a plan view showing an embodiment of the invention; Fig. 2 is a section taken on a plane indicated by the line II—II, Fig. 1; Fig. 3 is a sectional detail taken on a plane indicated by the line III—III, Fig. 2; Fig. 4 is a sectional detail taken on a plane indicated by the line IV—IV, Fig. 1; Figs. 5 and 6 are details in perspective; Fig. 7 is a plan view of a modification; Fig. 8 is a section taken on a plane indicated by the line VIII—VIII, Fig. 7; Fig. 9 is a detail in elevation; and Fig. 10 is a detail in plan view.

Referring more particularly to the drawing, the reference character 1 designates scraper blades held together in V-shape and having ties or brace bars 2. Handle means for pushing and guiding the device are provided, preferably a handle 3 being attached to each blade. Any suitable attachment may be employed, for example a removable engagement as by eye-bolts 4. If the handles be not rigidly secured to the blades, it is then desirable to further attach them to the brace bar 2. Hook bolts 5 for example may be employed for this. A skid, preferably in the form of a curved rod 6 is attached to the device forwardly, as at the angle between the blades. Conveniently a socket piece 7 may be fastened at the angle of the blades, and the skid 6 extending downwardly and backwardly in a curved sweep therefrom is engaged by the upper cross bar 2, for example the rod passing through the bar or through an eye-bolt on the bar as desired. An adjusting nut 8 screw-threadedly carried by the skid 6 provides for adjustment of the depth of set of the skid.

Where it is desired to vary the set of the angularly related blades with respect to each other, I connect these by hinges or the like 10, and toggling braces 11 may be connected between the blades 1 in addition to the brace bar 2. The latter may be provided with a slot or a series of holes as at 12 to variably engage with pins or upstanding bolts 13 in the edge of each blade. A set nut 14 may be applied to the toggle braces 11 for locking the same in desired position.

The manner of operation of the device will be clear from the foregoing. The operator grasping the handles 3 pushes the device along over the walk or other surface and the snow or material to be removed is pushed aside by the blades in a manner obvious. The set of the skid may be adjusted by means of adjusting nut 8, ordinarily only so much clearance being desired as is requisite for easy running. The front of the device can be raised without interfering with the rear, also. And altogether, adjustment may be had as required for any particular surface. The angle of the blades may be reduced or increased as desired, the set nut 14 and the bar 2 being arranged with respect to the bolts 13 in accordance with the spread required. When not in use, the handles can be turned up, and can be taken out for more compact storage. By collapsing the blades together also, the device can be stored or shipped flat, thus greatly economizing in space.

Other modes of applying the principle of the invention may be employed, change being made as regards the details described, provided the means stated in any of the following claims, or the equivalent of such, be employed.

I therefore particularly point out and distinctly claim as my invention:—

1. In a device of the character described, the combination of angularly related scraper blades, a brace bar therebetween, and a curved skid attached forwardly in the apex of the blades and adjustably secured to the brace bar.

2. In a device of the character described, the combination of angularly related scraper blades, a brace bar therebetween, a curved skid attached forwardly in the apex of the blades and passing through the brace bar, and an adjusting nut on said skid.

3. In a device of the character described, the combination of angularly related scraper blades, means for adjusting the angle of said blades, a brace bar between the blades, a curved skid attached forwardly in the apex of the blades and passing through the brace bar, and an adjusting nut for said skid.

Signed by me this 18th day of January, 1927.

HERMAN M. HURD.